Sept. 21, 1954

W. ANGST 2,689,480

SENSITIVE WIDE RANGE ALTIMETER

Filed April 15, 1950

INVENTOR.
Walter Angst

BY Howard G. Russell
his ATTORNEY

Sept. 21, 1954 W. ANGST 2,689,480
SENSITIVE WIDE RANGE ALTIMETER
Filed April 15, 1950 4 Sheets-Sheet 2

INVENTOR.
Walter Angst
BY
Howard G. Russell
his ATTORNEY

Sept. 21, 1954 W. ANGST 2,689,480
SENSITIVE WIDE RANGE ALTIMETER
Filed April 15, 1950 4 Sheets-Sheet 3

INVENTOR.
Walter Angst
BY
Howard G. Russell
his ATTORNEY

Sept. 21, 1954  W. ANGST  2,689,480
SENSITIVE WIDE RANGE ALTIMETER
Filed April 15, 1950  4 Sheets-Sheet 4

INVENTOR.
Walter Angst
BY
Howard G. Russell
his ATTORNEY

Patented Sept. 21, 1954

2,689,480

UNITED STATES PATENT OFFICE 2,689,480

SENSITIVE WIDE RANGE ALTIMETER

Walter Angst, Manhasset, N. Y., assignor, by mesne assignments, to Kollsman Instrument Corporation, Elmhurst, N. Y., a corporation of New York Application April 15, 1950, Serial No. 156,197

6 Claims. (Cl. 73—387)

This invention relates to improvements in altimeters of the type operating on the air pressure principle.

The development of aircraft operable at high altitudes has led to a demand for an altitude responsive device, particularly an indicating altimeter, capable of responding with great accuracy to changes in altitude within the greatly extended range of from zero to eighty thousand feet and beyond.

While there are altimeters in existence which meet exacting requirements of accuracy within limited altitude ranges, for example, the range up to twenty or thirty thousand feet, the construction of an instrument covering a much wider range presents particular difficulties which are not met by mere changes in the dimensions of the conventional instrument and of its component parts. A development along conventional lines of the conventional sensitive altimeter to increase its range meets with little success because of limitations inherent in the conventional design.

A conventional sensitive altimeter of limited range usually incorporates two pointers. A high altitude altimeter covering the range of, say, up to eighty thousand feet or one hundred thousand feet, requires at least one additional pointer or indicator, whereby the load on the diaphragm is correspondingly increased. Also it must be considered that with increasing altitude the pressure difference per revolution of any one pointer becomes progressively less. For this reason less power is available for moving a pointer through a certain angle at high altitudes than at low altitudes.

An increase in the size or in the number of the diaphragm capsules to provide for increased power leads to difficulties because it brings with it the necessity of balancing larger masses. There are now in use counterweights for balancing the diaphragm capsules and their associated mechanism. Such counterweights are satisfactory only if their movements are restricted to relatively small angular displacements about a fulcrum. It is common practice in this connection to mount such counterweights by means of a flexible flat spring whose tension also serves to eliminate lost motion in the mechanism. An increase in the mass of the balancing weight and the use of a more powerful flat spring leads to undesirably large dimensions of the instruments, leads to difficulties in temperature compensation and to an increase in bearing friction because of the greater forces exerted by the counterbalancing mechanism on the various pivots. It thus becomes evident that the advantage of a more powerful actuating mechanism is largely lost because of a nearly proportional increase in frictional losses and because of mounting compensation difficulties which are all the more serious since the temperature range within which the instrument is used is also greatly increased.

The present invention involves a distinct departure from the conventional construction of altimeters which, as will be apparent from the following description, leads to an elimination of the problems encountered in the mass-balancing of the conventional altimeters and furthermore results in an instrument of compact design and surprisingly small dimensions.

In the improved instruments two pressure responsive units are arranged in such a way that each unit balances the other, leading to a heretofore unobtained degree of freedom from error due to mass inertia not obtainable by conventional balancing.

The various objects, features, and advantages of this invention will appear more fully from the detailed description which follows accompanied by drawings showing, for the purpose of illustration, a preferred embodiment of the invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which;

Figure 1:
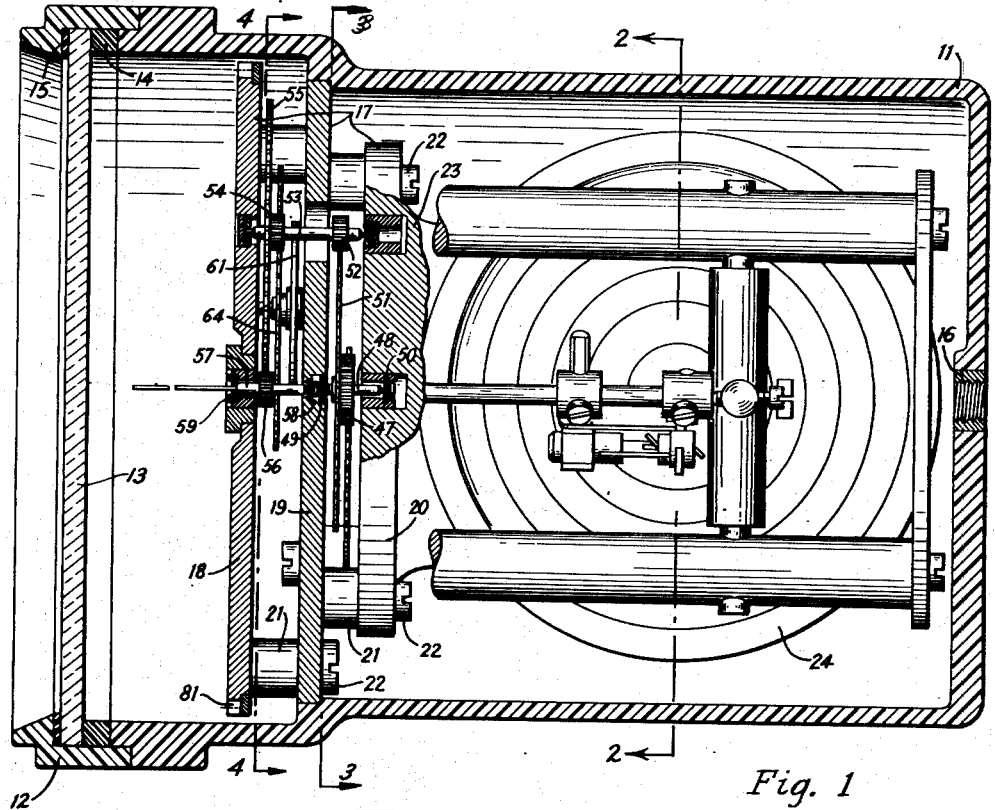
Figure 1 is a cross sectional view through an altimeter incorporating the present invention, the dial and pointer being omitted for the sake of clearness.
Figure 2:
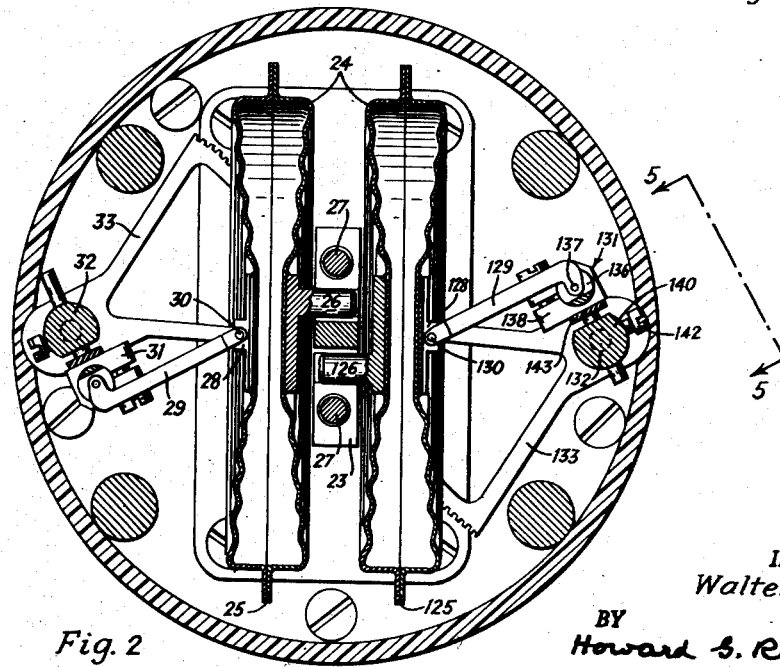
Figure 2 is a transverse section through the instrument mechanism shown in Figure 1, the section being taken on line 2—2 of Figure 1.

In the following description and in the claims various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the broad principles of the invention and that the invention may be applied to other structures than the ones shown.

The pressure responsive mechanism of the altimeter is enclosed in a pressure tight housing 11 having a demountable front cover 12 within which a transparent window 13 is pressure tightly mounted by gaskets 14 and 15. The housing 11 has a bushing 16 in the rear wall for connection of the instrument to a static pressure line.

The instrument mechanism includes a mounting support 17 which may be an assembly of individual plates 18, 19 and 20 rigidly interconnected by studs 21 and screws 22. The instrument support 17 has a central bracket 23 on which a stack of diaphragm capsules 24 is mounted.

According to the invention the stack of diaphragm capsules is supported intermediate its ends to permit movement of the free end walls of the stack by substantially equal amounts in opposite directions upon a change in pressure. In the event the stack 24 consists of only two capsules 25 and 125, as in the illustrated embodiment of the invention, it is convenient to provide each capsule with a center post 26 and 126 adjustably clamped within the central bracket 23 by bolts 27 so as to locate the two diaphragm symmetrically with respect to the axis of a common pinion 47. The free walls of the diaphragm capsules 25 and 125 carry central bosses 28 and 128 to which links 29 and 129 are pivotally connected at 30 and 130. The bar ends of the links 29 and 129 transmit the movement of the diaphragm capsule to temperature compensators 31 and 131 on rocking shafts 32 and 132 carrying gear sectors 33 and 133.

Figure 5:
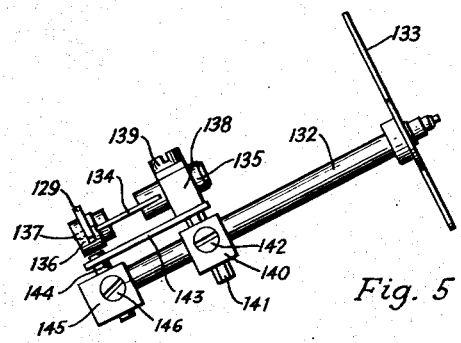
Figure 5 is a detailed view of the rocking shaft and sector assembly, the view being taken on line 5—5 of Figure 2.
Figure 6:
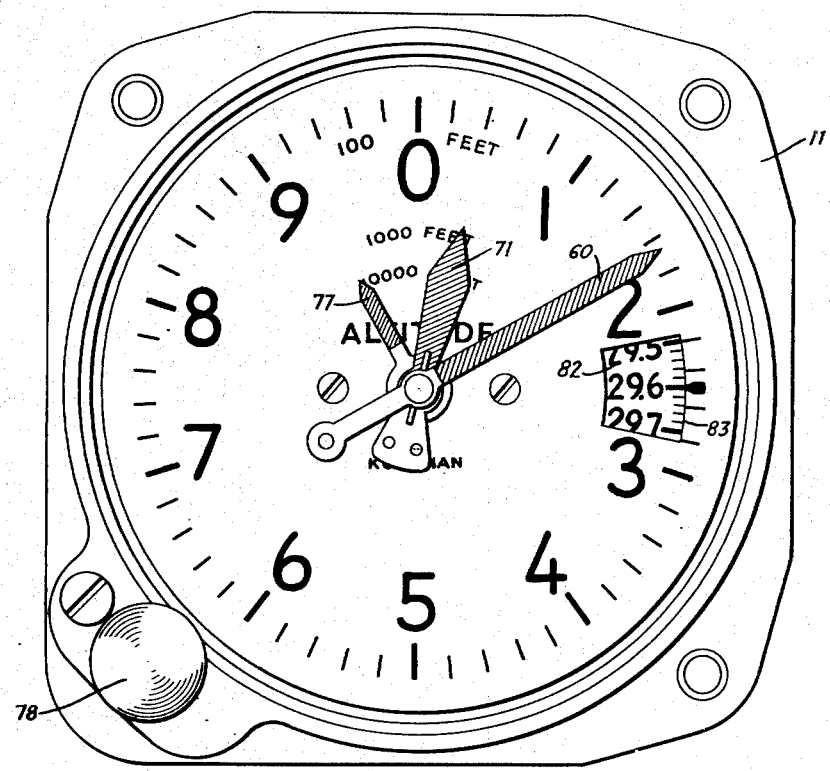
Figure 6 is a front view of the instrument.

A preferred form of temperature compensator is shown in detail in Figure 5 and comprises a bimetallic member or strip 134 mounted on a cylindrical arm 135 with one end and carrying a head 136 at the other end. The link 129 is attached to the head 136 at a pivot axis 137. The cylindrical arm 135 is adjustably clamped in a post 138 by a screw 139. The post 138, in turn, is held in a boss 140 on the rocking shaft 132. The arrangement is preferably such, that the distance of the cylindrical arm 135 from the rocking shaft 132 is variable without disturbance of the parallel relationship of the bimetallic member 134 with respect to the rocking shaft 132. For this purpose the post 138 is provided with a flat surface portion 141 against which a set screw 142 in the boss 140 bears. A further arm 143 secured to the post 138 has a slot on its free end which engages a pin 144.

The pin is held in a boss 145 and is clamped therein by a set screw 146.

The illustrated compensator permits manual and automatic adjustment of the lever arm at which the link 129 engages the rocking shaft 132. After loosening of the set screw 142 the length of the lever arm may be manually increased or decreased for calibration purposes by moving the post 138 further away from, or closer towards, the rocking shaft, whereafter the set screw 142 is tightened.

Changes in temperature cause the bimetallic member 134 to flex. In the position shown the bimetallic member tends to increase and decrease, in dependence on temperature, the effective length of the lever arm at which the link 129 acts on the rocking shaft. The influence of the bimetallic member 134 may be lessened by turning its supporting arm 135 relatively to the post 138 after loosening of the set screw 139.

Figure 3:
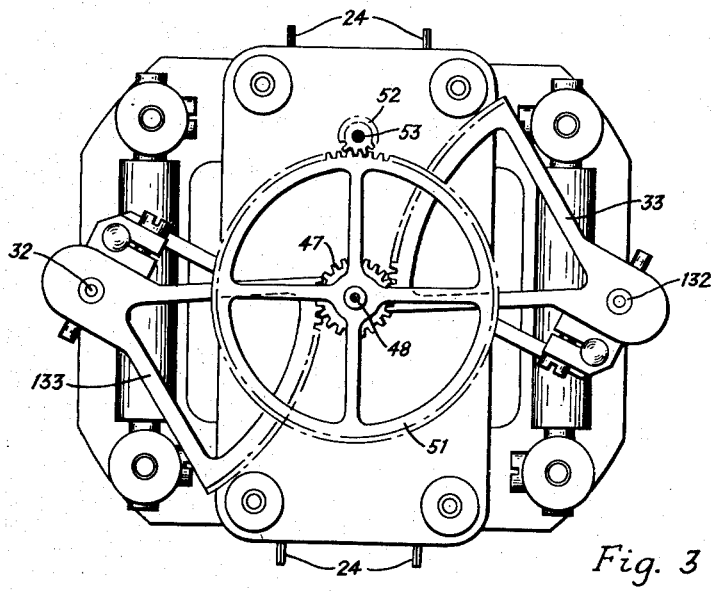
Figure 3 is a transverse sectional view taken on line 3—3 of Figure 1.
Figure 4:
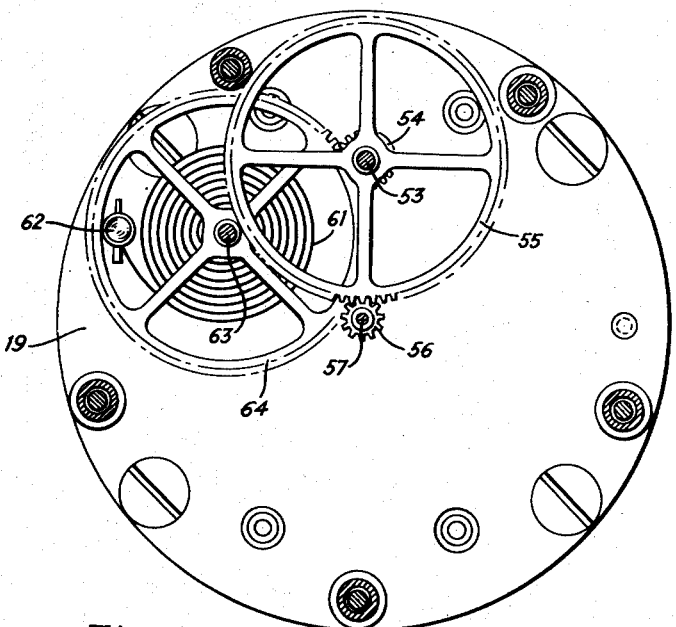
Figure 4 is a sectional view taken on line 4—4 of Figure 1.
Figure 7:
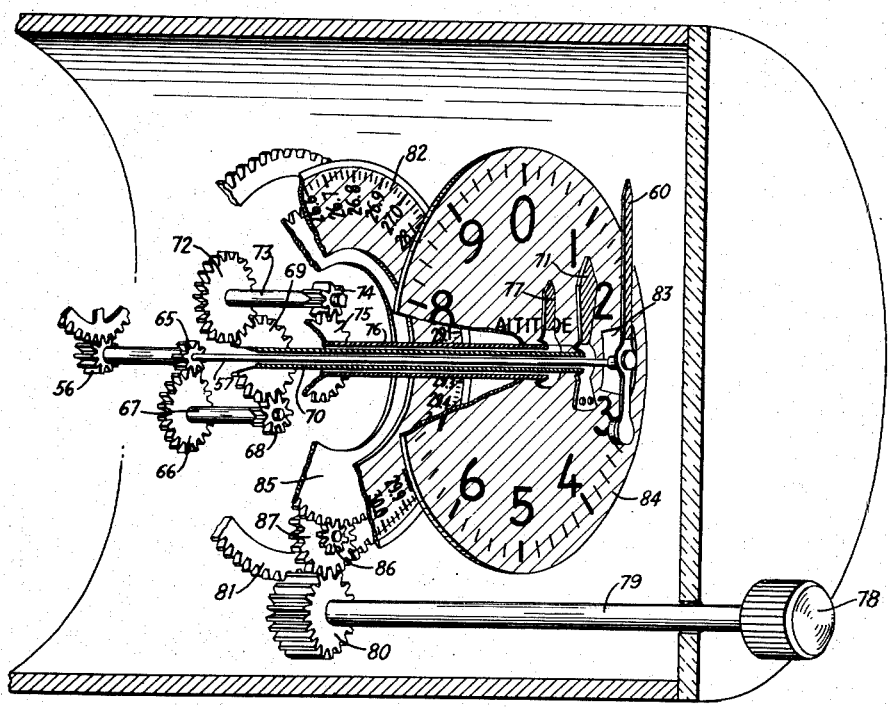
Figure 7 is a perspective exploded view illustrating the pointer mechanism and the zero setting device of the instrument of Figure 1.

Referring now to Figure 3, it is seen that the two gear sectors 33 and 133 mesh with a pinion 47 on a shaft 48 supported in bearings 49 and 50 (Figure 1). The shaft 48 carries a large gear 51 meshing with a pinion 52 on a shaft 53 extending through the plate 19 (Figure 1). The shaft 53 carries on it a further pinion 54 and a large gear 55 which meshes with a pinion 56 on a hand-staff 57. The hand-staff is mounted in bearings 58 and 59 and carries the large hand or pointer 60 (Figure 7). A hair spring 61 is provided for the purpose of eliminating play and lost motion in the gear mechanism. The hair spring is secured with its outer end to a post 62 on the plate 19 (Figure 4) and is attached to a shaft 63 with its inner end. The shaft 63 carriers a large gear 64 meshing with the pinion 54 on the shaft 53. The gear ratio is so chosen as to limit the revolutions of the shaft 63, during traverse of the instrument through its entire range, to a number at which the turns of the hair spring will remain substantially in one plane.

For convenience of illustration the indicator assembly is shown in an exploded view in Figure 7 in which certain dimensions, particularly the longitudinal dimensions, are shown greatly exaggerated for the sake of clearness.

A pinion 65 on the hand-staff 57 engages a gear 66 on a shaft 67 carrying a pinion 68. The pinion 68 meshes with a gear 69 on a hollow shaft 70 carrying a second or intermediate hand or pointer 71.

The gear 69 further meshes with a gear 72 on a shaft 73 carrying a pinion 74. The pinion 74 meshes with a gear 75 on a hollow shaft 76 carrying a small third hand or pointer 77.

The ratios of the gear trains between the several pointers are metric. The larger pointer 60 makes one revolution for a change in altitude of 1000 feet and thus indicates feet. The intermediate pointer 71 makes one revolution for every ten revolutions of the pointer 60 and thus indicates thousands of feet. The small pointer 77, finally, makes one revolution for every ten revolutions of the intermediate pointer 71 and thus indicates tens of thousands of feet. Thus the indicator assembly covers a total range of from zero to one hundred thousand feet.

The indication of the instrument may be corrected to take into consideration the barometric pressure prevailing at sea level. This correction or setting is accomplished by turning the entire actuating mechanism inside the instrument housing by a setting knob 78 on a shaft 79 carrying a pinion 80. The pinion 80 meshes with a ring gear 81 on the plate 18. Turning of the knob 78 causes the actuating mechanism to turn in the case and, with it, the large pointer 60 moves relatively to the main dial 84.

The required amount of setting of the mechanism for a given change in the atmospheric pressure is ascertained at a barometric dial 82 visible through a window 83 in the fixed dial 84 over which the pointers 60, 71 and 77 move. The barometric dial 82 is secured to a larger gear 85 meshing with a pinion 86 on a gear 87. The gear 87 meshes with the setting pinion 80. Thus, turning of the knob 78 causes the barometric dial 82 to move behind the window 83 by reason of the gear drive 80, 87, 86, 85 and also causes the entire actuating mechanism to turn by means of the gear drive 80, 81.

The operation of the pressure sensitive mechanism requires little explanation. Changes in the pressure of the air acting on the diaphragm capsules cause the diaphragms to expand and contract, as the case may be. The substantially straight-line movement of the diaphragm is converted into rotary movement by the rocking shafts, and the gear mechanism magnifies the rotation of the rocking shafts and transmits it to the pointers.

It is quite apparent from an inspection of the illustration alone that symmetrical arrangement of the various elements of the mechanism results in perfect counterbalancing of the masses. It is, of course, good practice to construct the various shafts and pivoted assemblies in such a way as to provide for substantial balance of these shafts and assemblies about their respective axes, without increasing the moving masses by the addition of counterweights. However, any unbalance which exists is automatically compensated. Referring to Figure 3, for example, and assuming that the gear sectors 33 and 133 were slightly, but equally unbalanced, it is quite apparent that any such unbalance about the rocking shaft 132 tending to cause turning of the pinion 47 in one direction is opposed by an equal tendency of the rocking shaft 32 to turn the pinion 47 in the opposite direction. It is thus seen that the symmetric arrangement of equally shaped and equally dimensioned elements of the actuating mechanism inherently produces balance, both static as well as dynamic, without the aid of the additional counter-balancing masses which are customarily attached to pivoted assemblies in instruments of this type.

However, the beneficial results of the novel arrangement go beyond the problems of balancing or the elimination of special weights or masses for the purpose of counter-balancing.

Referring again to Figure 3 it is easily seen that the illustrated assembly lends itself to the automatic elimination of play or lost motion between the diaphragm capsules 24 proper and the pinion 47. It is practically impossible to produce two diaphragm capsules which expand and contract with such microscopic precision as to cause turning of the two sectors 33 and 133 in such a way that the same amount of play occurs between the teeth of the sectors and those of the pinion 47 at all points of the pressure range. It is thus apparent that minute inequalities in the characteristics of the two diaphragms result in no appreciable lost motion or play between the diaphragms and the pinion, since one diaphragm invariably lags behind the other, though ever so slightly. Assuming, however, that the two diaphragm capsules are so perfectly matched as to turn both rocking shafts and sectors with such microscopic evenness that there is still ascertainable play within the actuating mechanism, it is obvious that this can readily be remedied by mounting one of the diaphragm capsules so that it lags slightly behind the other. This lag should always exceed the maximum disparity of movement of the two diaphragm systems throughout their operating range and the resultant preloading should be at least equal to the friction of the gear trains. Thus the diaphragm system and associated gears are subject to a minimum of preloading throughout their operating range, and the usual preloading spring with its inevitable errors is rendered unnecessary. Elimination of the customary preloading spring results in reduced bearing pressure, reduced friction and greater accuracy.

The invention thus provides an extremely simple pressure indicating instrument of utmost accuracy covering a range of pressure, or altitude, heretofore unattained with a single instrument of comparable size.

Obviously the principles of this invention may be applied to other forms of instruments. In this connection numerous additions, omissions, substitutions and other changes may be made without departure from the spirit and the essence of the present invention.

What is claimed is:

1. A balanced movement, particularly for a wide range sensitive pressure responsive instrument comprising a central support; a pair of diaphragm capsules mounted on said support for expansion and contraction in opposite directions for a given pressure change; a central pinion mounted on said support; a pair of gear sectors meshing with said pinion; a rocking shaft for each of said sectors; and a link pivotally connecting the movable wall of each capsule with its respective rocking shaft to turn the rocking shafts in opposite directions on a change in pressure acting on the capsules, one of said diaphragm capsules lagging the other of said diaphragm capsules to automatically eliminate lost motion between said diaphragm capsules and said central pinion.

2. A balanced movement, particularly for a wide range sensitive altitude responsive instrument comprising, a mounting plate having a central support; a first diaphragm capsule mounted on said support for expansion and contraction of its free wall in a direction substantially parallel to the mounting plate; a pinion centrally mounted with respect to said mounting plate, the pinion axis being substantially normal to the mounting plate; a first gear sector meshing with said pinion; a first rocking shaft carrying said first gear sector, the rocking shaft axis being substantially parallel with said pinion axis; a first linkage connecting the free wall of said capsule with said rocking shaft to turn said shaft upon movement of said free wall; and a second diaphragm capsule, a second gear sector, a second rocking shaft and a second linkage of equal dimensions as, and symmetrically arranged with respect to, said first capsule, said first sector, said first rocking shaft and said first linkage to move in the opposite sense and direction, the plane of symmetry being substantially normal to said mounting plate and passing through said central support, the said second sector also meshing with said pinion, whereby gravity and acceleration effects cancel out at said pinion, said first diaphragm capsule lagging said second diaphragm capsule by an amount exceeding the maximum disparity of movement of said balanced movement to automatically eliminate the lost motion between said first and second diaphragm capsules and said pinion.

3. A balanced movement, particularly for a wide range sensitive altitude responsive instrument comprising, a stack of diaphragm capsules; a support for said stack of capsules intermediate its ends permitting movement of the free end walls of the stack in opposite directions upon a change in pressure; a pinion mounted on said support, the pinion axis being substantially normal to the axis of the stack of capsules; a pair of gear sectors meshing with said pinion, the axes of the gear sectors being parallel with each other and with the pinion axis and being equidistant from, and on opposite sides with respect to, the said pinion axis; a pair of rocking shafts supporting said sectors for turning about their respective sector axes; and a linkage between each free end wall of the stack and its respective rocking shaft for tilting said rocking shaft in response to movement of the end wall, the connection of the linkages to the respective rocking shafts being such that the rocking shafts turn in opposite directions on a change in pressure, one of said free end walls of said stack of capsules lagging the other of said free end walls of said stack of capsules to automatically eliminate any lost motion between said stack of capsules and said pinion.

4. A balanced wide range altimeter comprising, a substantially cylindrical instrument housing; a mounting plate concentrically arranged within said housing; a stack of diaphragm capsules supported on said mounting plate intermediate the ends of the stack for movement of the free end walls of the stack in opposite directions upon a change in pressure, the axis of the stack being substantially transverse with respect to the housing axis; a pinion mounted for rotation relatively to said plate about an axis substantially parallel with the housing axis; a pair of gear sectors meshing with said pinion, the axes of the gear sectors being parallel with each other and with the pinion axis and being equidistant from, and on opposite sides with respect to, said pinion axis; a pair of rocking shafts supporting said sectors for turn about their respective sector axes; a linkage between each free end wall of the stack and its respective rocking shaft for tilting said rocking shaft in response to movement of the end wall, the connection of the linkages to the respective rocking shafts being such that the rocking shafts turning in opposite directions on a change in pressure, and indicating means driven by said pinion, one of said free end walls of said stack of capsules lagging the other of said free end walls of said stack of capsules by an amount exceeding the maximum disparity of movement in said altimeter to automatically eliminate any lost motion between said stack of capsules and said pinion.

5. A balanced wide range altimeter, an instrument housing having a transparent window; a dial visible through said window; a support mounted in said housing for rotation about the housing axis; means for indicating the clock-dial position of said support relatively to said housing; manually operable means for rotating said support relatively to said housing; a stack of diaphragm capsules mounted on said support intermediate the ends of the stack permitting movement of the free end walls of the stack in opposite directions upon a change in pressure; the axis of the stack being substantially transverse to the housing axis; a pinion mounted for rotation relatively to said support about an axis substantially parallel with the housing axis; a pair of gear sectors meshing with said pinion, the axes of the gear sectors being parallel with each other and with the pinion axis and being equidistant from, and on opposite sides with respect to, said pinion axis; a pair of rocking shafts supporting said sectors for turning with the rocking shafts about their respective axes; a linkage between each free end wall of the stack and its respective rocking shaft for rocking said shaft in response to movement of the end wall, the connection of the linkages to the responsive rocking shafts being such that the rocking shafts turn in opposite directions on a change in pressure; and a pointer driven by said pinion, said pointer being readable on said dial, one of said free end walls of said stack of capsules lagging the other of said free end walls of said stack of capsules by an amount exceeding the maximum disparity of movement in said altimeter to automatically eliminate any lost motion between said stack of capsules and said pinion.

6. A balanced movement as set forth in claim 1, one of said diaphragms being set to lag behind the other by an amount greater than the maximum disparity between the motions of the two diaphragms throughout their operating range to place the linkage system under opposing forces which eliminate backlash in a constant manner through the entire range of operation.

References Cited in the file of this patent

UNITED STATES PATENTS

| Number | Name | Date |
|---|---|---|
| 1,240,790 | Bristol | Sept. 18, 1917 |
| 1,403,972 | Middleton | Jan. 17, 1922 |
| 1,749,494 | Luckey | Mar. 4, 1930 |
| 1,857,311 | Kollsman | May 10, 1932 |
| 2,034,909 | Kollsman | Mar. 24, 1936 |
| 2,166,595 | Jenny | July 18, 1939 |
| 2,194,624 | Titterington, Jr. | Mar. 26, 1940 |
| 2,358,613 | Angst | Sept. 19, 1944 |

FOREIGN PATENTS

| Number | Country | Date |
|---|---|---|
| 299,667 | Germany | Sept. 7, 1915 |